United States Patent [19]
McKinlay

[11] Patent Number: 6,019,065
[45] Date of Patent: Feb. 1, 2000

[54] METHOD AND APPARATUS FOR REDUCING DAMAGE TO EGGS

[76] Inventor: Bruce A. McKinlay, R.R. #3, Ridgetown, Ontario, Canada, N0P 2C0

[21] Appl. No.: 09/201,773

[22] Filed: Nov. 30, 1998

[51] Int. Cl.[7] .................................................. A01K 31/16
[52] U.S. Cl. ........................................... 119/337; 119/335
[58] Field of Search .................................... 119/335, 336, 119/337, 338

[56] References Cited

U.S. PATENT DOCUMENTS

| 1,911,633 | 5/1933 | Lohrer | 119/335 |
|---|---|---|---|
| 3,672,485 | 6/1972 | Walters | 119/338 |
| 4,364,332 | 12/1982 | Smith | 119/337 |
| 4,766,849 | 8/1988 | Kawabata et al. | 119/337 |
| 5,002,016 | 3/1991 | De Vrieze | 119/337 |
| 5,279,254 | 1/1994 | Dowty | 119/337 |

OTHER PUBLICATIONS

Automatic Roll–Away Nests—Brochure issued by Machinefabriek en konstruktiebedrijf b.v.
Soft–Touch II Egg De–Escalator System—Pamphlet issued by Chore–Time Cage Systems.
Original Specht Poultry Equipment—The Belt Battery—Pamphlet issued by Ten Elsen GmbH & Co KG.
Center Belt Egg Gathering System—Pamphlet issued by Shenandoah Manufacturing Co., Inc.
Layer Cage System—Pamphlet issued by Farmer Automatic.

*Primary Examiner*—Peter M. Poon
*Assistant Examiner*—Elizabeth Shaw
*Attorney, Agent, or Firm*—Arne I. Fors

[57] ABSTRACT

A method and an apparatus for preventing a second egg from directly contacting a first egg when the second egg exits a cage travelling in a first direction through a cage opening onto a conveyor belt travelling in a second direction substantially transverse to the first direction from an upstream side to a downstream side of the cage opening. The apparatus comprises a contact strip, the contact strip having a proximal end and a distal end and being made of a flexible material, and means for attaching the proximal end to the cage near the cage opening on the upstream side thereof such that the distal end of the contact strip is disposed on the conveyor belt opposite the downstream side of the cage opening whereby the contact strip extends across the cage opening to prevent the second egg from directly contacting the first egg.

14 Claims, 4 Drawing Sheets

METHOD AND APPARATUS FOR REDUCING DAMAGE TO EGGS

FIELD OF THE INVENTION

The present invention pertains to the collection of eggs in such a way as to minimize damage to the eggs. In particular, the present invention pertains to the fields of devices and processes intended to reduce damage to an egg when the egg exits the cage in which it was laid.

BACKGROUND OF THE INVENTION

In modern commercial egg collection businesses, the methods and apparatus used in poultry egg collection must be such that damage to the eggs is minimized. For example in a modern operation in which the eggs of fowl, such as turkeys or chicken, are collected, the fowl can be kept in cages. The eggs are laid in the cages. The floor of a cage in which, for example, a chicken lays an egg can be disposed so that, when the egg is laid, it will roll out of the cage through an opening at the front thereof. A modern commercial egg layer operation can include one or more rows of cages arranged in the same horizontal plane and aligned beside a conveyor having a conveyor belt such that, when an egg rolls out of the cage opening after having been laid, it goes onto the conveyor belt. In this way, a large number of eggs can be collected by means of a conveyor belt. The conveyor belt brings the eggs which have rolled onto it to a collection area, at which the eggs may conveniently be further processed.

A modern commercial egg layer operation can also include a multiplicity of the rows of cages as described above, such rows being disposed above and below other rows in tiers. Cages may be constructed of wire or bars. Alternatively, automatic roll-away nesting boxes for poultry raised on the floor can be constructed of sheets of durable material such as galvanized sheet steel or plastic, as well as wires or bars.

In such an operation, when an egg rolls out of a cage or nest opening onto a conveyor belt, the egg can collide with another egg already on the conveyor belt. Such a collision can result in damage to one or both of the eggs such that one or both of the eggs can thereby be rendered less valuable than otherwise would have been the case, or even worthless. The conveyor belt often is not sufficiently wide to enable two eggs to be on it side by side.

As used herein, the term "cage" is intended to comprise any cage or nest enclosure in which an egg-laying animal can be kept or lay eggs, and includes any such enclosures made of wires, bars, sheet materials, or any combinations thereof arranged in tiers or floor cages.

For the foregoing reasons, there is a need for a method and an apparatus which will reduce damage to eggs resulting from collision of a newly-laid egg, as it rolls out of the cage, with an egg already on the conveyor belt.

SUMMARY OF THE INVENTION

It is an object of the present invention to overcome or mitigate deficiencies in the prior art.

In a broad aspect of the present invention, there is provided a contact strip for attachment to a poultry cage comprising an elongated strip having a proximal end and a distal end and being made of a flexible material, and connecting means for attaching the proximal end to the cage.

In another aspect of the present invention, there is provided an apparatus for preventing a second egg from directly contacting a first egg when the second egg exits a cage. As it exits the cage in which it was laid, the second egg travels in a first direction through a cage opening in a front portion of the cage. The cage has side walls, a floor portion inclined down towards the front portion, and may have an inclined ramp extension. The second egg moves along the ramp extension onto a conveyor belt after the second egg exits the cage, the conveyor belt being disposed and travelling in a second direction substantially transverse to the first direction, from an upstream side to a downstream side. The first egg can be disposed on the conveyor belt from a cage upstream in the second direction from the cage opening before the exit of the second egg from the cage opening. The apparatus comprises a contact strip, the contact strip having a proximal end and a distal end and being made of a flexible material, and means for attaching the proximal end to the cage near the cage opening such that the proximal end of the contact strip extends from the upstream side of the cage opening in the first direction and the proximal end of the contact strip is disposed on the conveyor belt downstream from the cage opening in the second direction, whereby the second egg is prevented by the contact strip from directly contacting the first egg until the second egg is travelling on the conveyor belt in the second direction with the first egg.

It is preferred that the proximal end of the contact strip is attached to the cage at a side wall portion near the cage opening or at a position mid-way or one-third the distance between the side walls at the cage opening such that the proximal end of the contact strip is disposed on top of the floor portion, and such that the distal end of the contact strip is disposed on top of the conveyor belt, and such that the contact strip can be held substantially vertically upright.

It is preferred that the means for attaching the first end of the contact strip to the cage is a fastener selected from a group consisting of hook and loop fasteners, cable ties, rivets, adhesive, adhesive tape, glue, and hog rings.

It is also preferred that the flexible material have the characteristics of a flexible polyester or a polycarbonate resin, such as Lexan™.

In accordance with another aspect of the present invention, the contact strip is from approximately 1" to 1.25" in height and from approximately 0.014" to 0.020" in thickness. More preferably, the contact strip is 1⅛" in height and 0.020" in thickness.

In another alternative embodiment, the apparatus for preventing a second egg from directly contacting a first egg can also comprise a timing means for intermittently activating the conveyor belt whereby the conveyor belt can be intermittently activated to travel a distance in the second direction which is equal to or greater than the effective length of the contact strip, i.e., substantially the length of the contact strip on the belt.

In another aspect of the present invention, there is provided a method of attaching a contact strip to a cage, the cage having a front portion, a floor portion inclined down towards the front portion, and a cage opening defined by side walls. The cage opening is disposed such that an egg laid in the cage can exit the cage through the cage opening travelling in a first direction generally perpendicular to the cage opening, to move onto a conveyor belt after exiting the cage. The conveyor belt is disposed and travelling in a second direction substantially transverse to the first direction, from an upstream side to a down stream side, the cage opening being in the front portion. The method comprises the step of attaching the contact strip to the cage or in proximity to the cage, such that the proximal end of the contact strip is disposed on top of the floor portion, and such that distal end of the contact strip is disposed on top of the conveyor belt, downstream in the second direction from the cage opening and such that the proximal end and the distal end are disposed substantially vertically upright.

Alternatively, there is provided a method of attaching a contact strip to a cage, the cage having side walls, a front portion, a floor portion inclined down towards the front portion, and a cage opening defined by the side walls. The cage opening is disposed such that an egg laid in the cage can exit the cage through the cage opening travelling in a first direction to move onto a conveyor belt after exiting the cage. The conveyor belt is disposed and travelling in a second direction across the cage opening substantially transverse to the first direction, from an upstream side to a downstream side, the cage opening being in the front portion. The method comprises the step of attaching the contact strip to the cage or in proximity to the cage, such that the proximal end of the contact strip is disposed on top of the floor portion, and such that the distal end of the contact strip is disposed on top of the conveyor belt, downstream in the second direction from the cage opening and such that the proximal end and the distal end are disposed substantially vertically upright, and advancing the conveyor belt intermittently whereby the conveyor belt can travel a distance in the second direction which is equal to or greater than the effective length of the contact strip or the width of the cage, whichever is lesser.

BRIEF DESCRIPTION OF THE DRAWINGS

A preferred embodiment of the present invention will now be described, by way of example only, with reference to the attached drawings, in which.

DETAILED DESCRIPTION OF A PREFERRED EMBODIMENT

Figure 1:
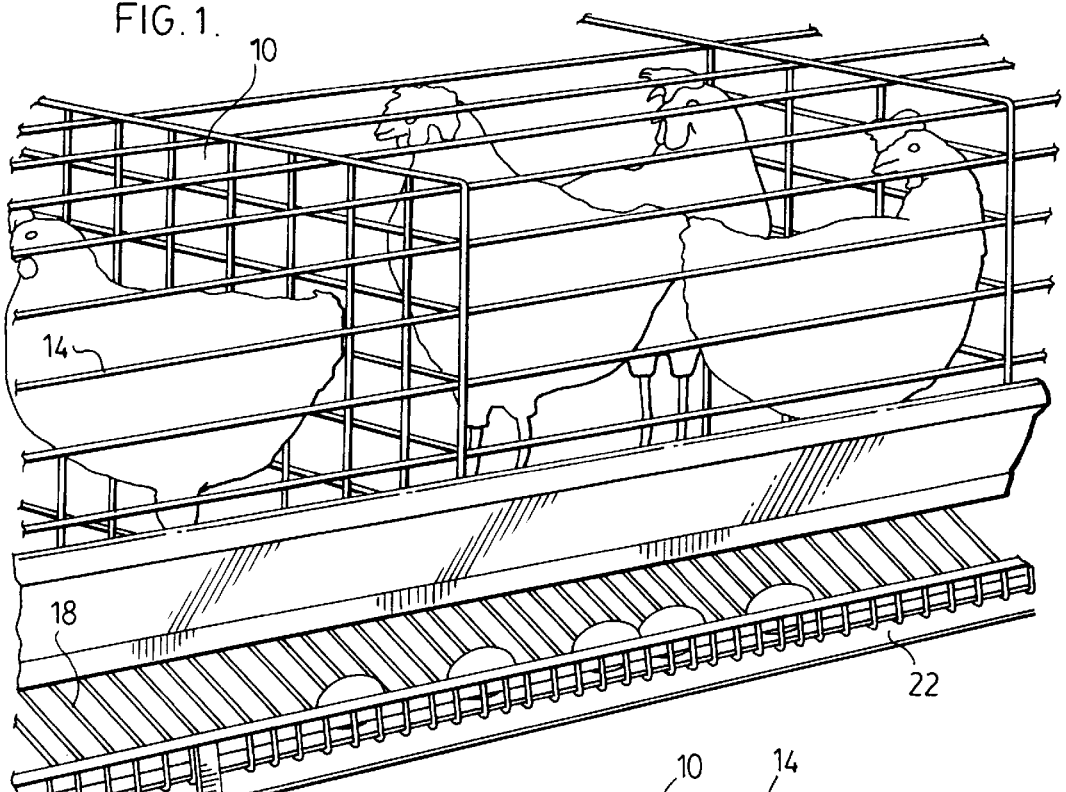
FIG. 1 is a perspective view of a cage prior to the attachment of a contact strip to the cage.

FIG. 1 shows a perspective view of a prior art cage indicated generally at 10 before the attachment of a contact strip of the invention to the cage. The cage 10 has a front portion 14 and an inclined ramp extension 18 with a conveyor belt 22 travelling across the front of the cage.

Figure 2:
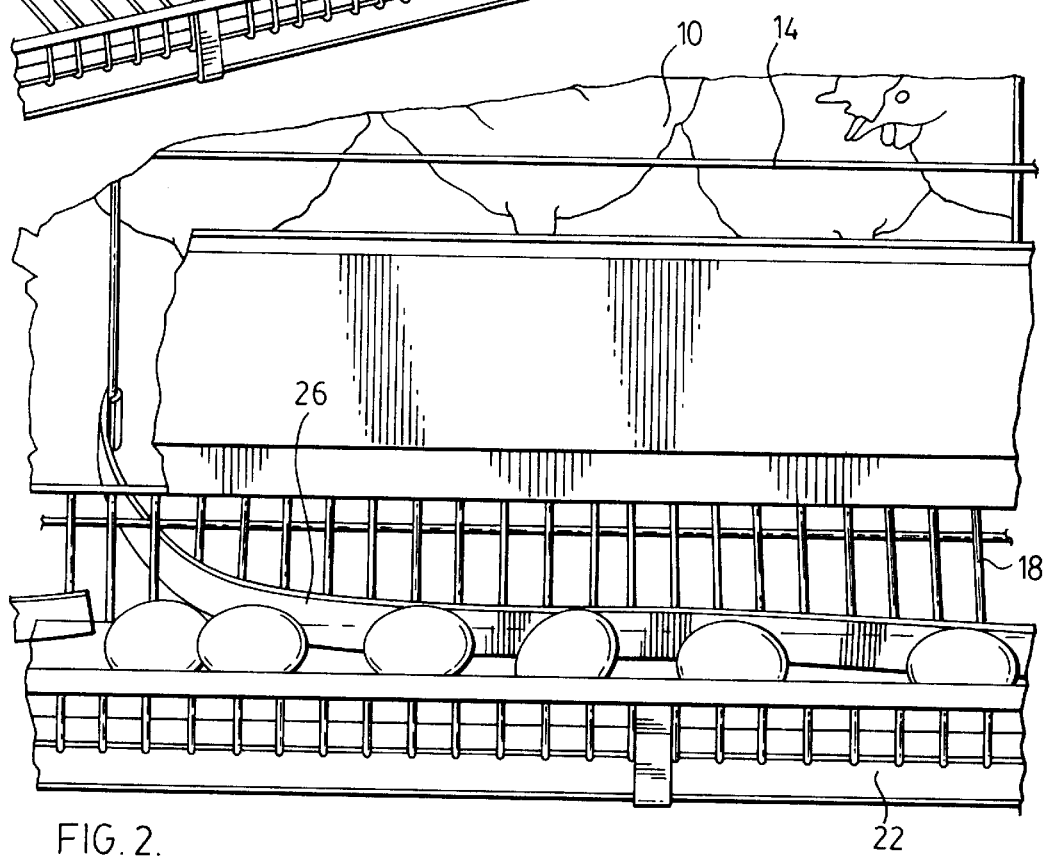
FIG. 2 is a first perspective view of a cage, a conveyor belt, and a contact strip in accordance with the present invention attached thereto.
Figure 3:
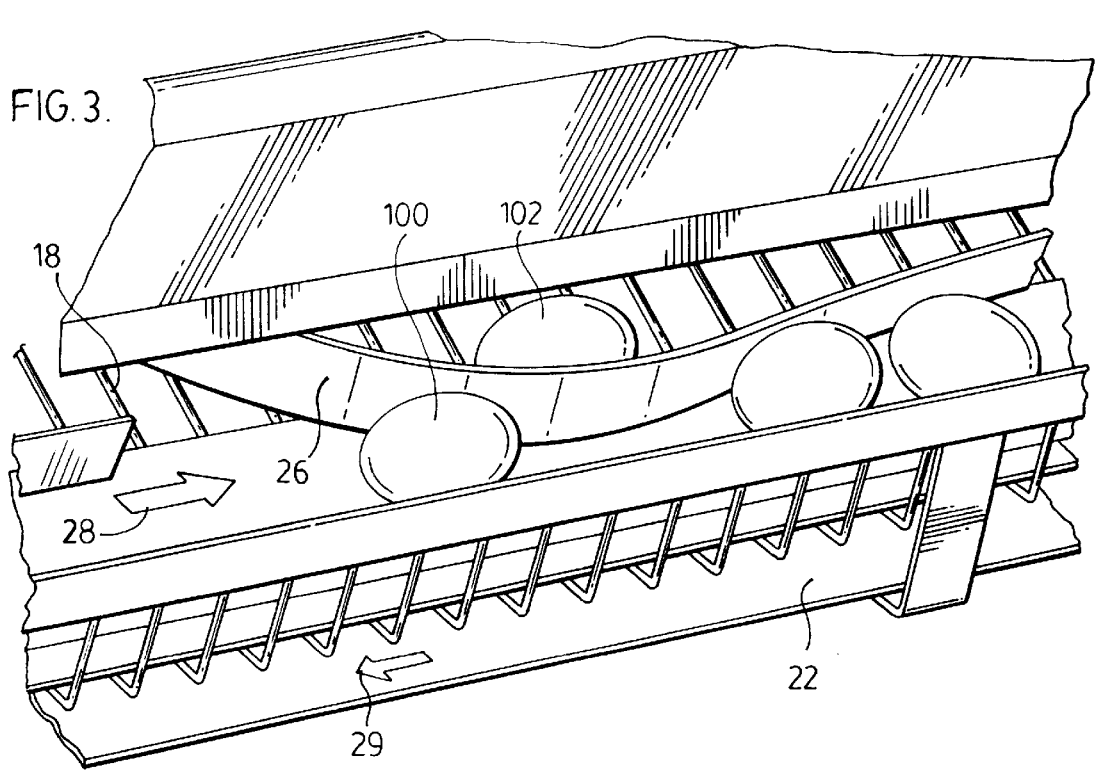
FIG. 3 is a second perspective view of a cage, a conveyor belt, and the contact strip shown in FIG. 2.
Figure 4:
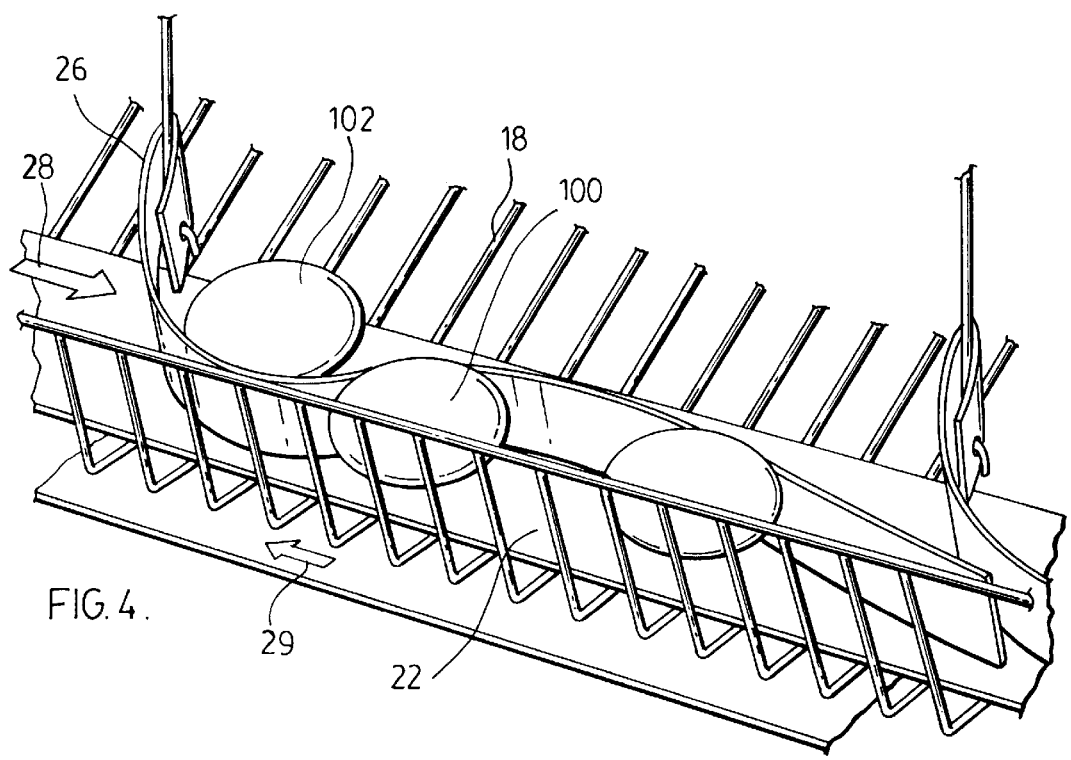
FIG. 4 is a third perspective view of a cage, a conveyor belt, and the contact strip shown in FIG. 2.
Figure 6:
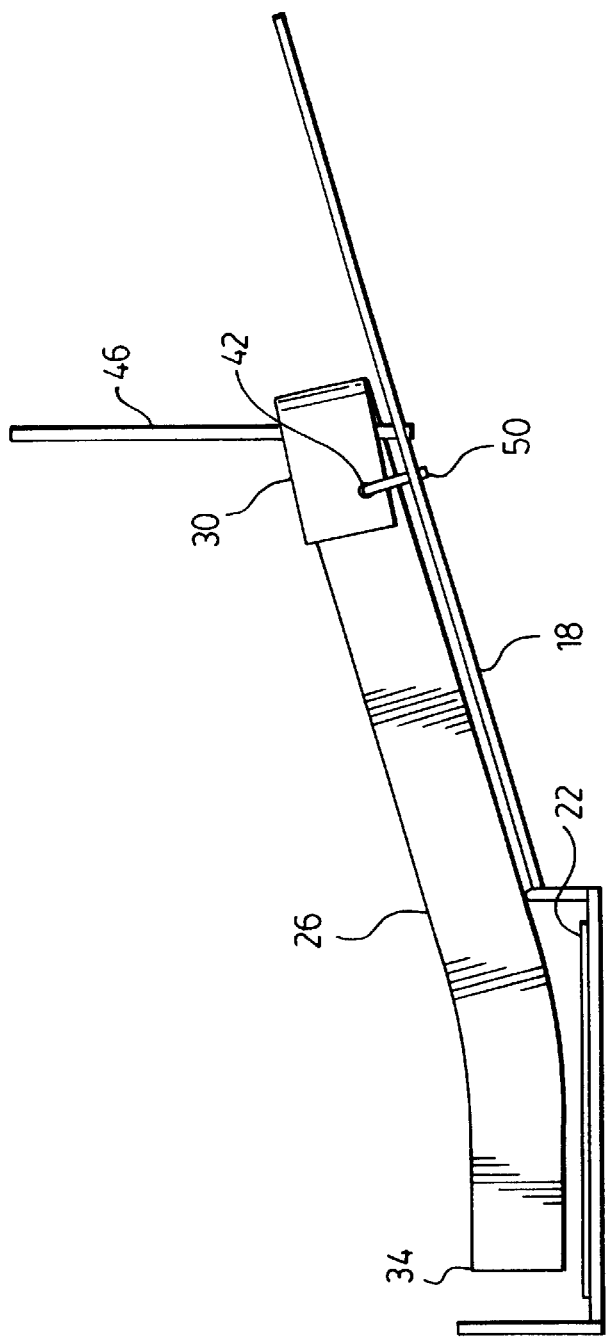
FIG. 6 is a side view of the contact strip shown in FIG. 5 after the contact strip has been attached to a cage.

FIGS. 2, 3, and 4 are second, third, and fourth perspective views respectively of the cage 10 and the conveyor belt 22 after a contact strip 26 has been attached thereto. The direction of travel of the conveyor belt 22 is shown by an arrow 28 in FIGS. 3 and 4, the return direction being designated by numeral 29. In FIG. 6, the inclined ramp extension 18, the conveyor belt 22, the contact strip 26 and fastener 50 are shown.

Figure 5:
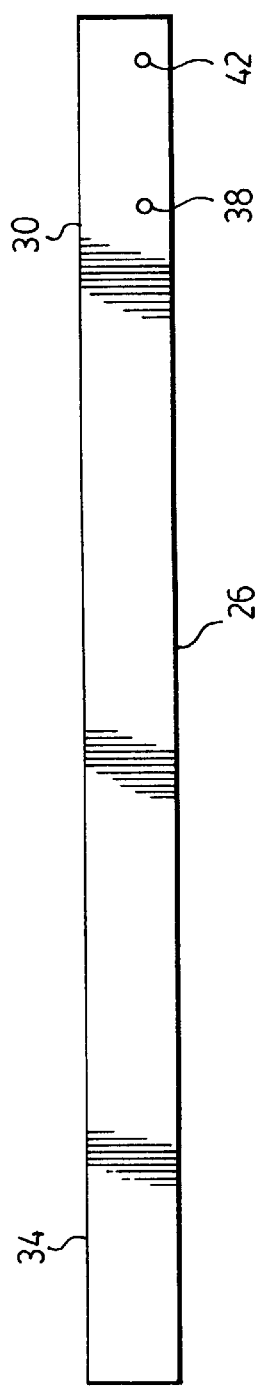
FIG. 5 is a side view of a contact strip in accordance with the present invention, before such contact strip is attached to a cage.

FIG. 5 shows a side view of a contact strip indicated generally at 26 having a proximal end 30 and a distal end 34, a first fastener hole 38, and a second fastener hole 42.

FIG. 6 shows a side view of the contact strip 26 after it has been attached to a cage (not shown). A portion of the proximal end 30 has been wrapped around a vertical post 46, such vertical post 46 forming part of the cage near the cage opening (not shown) either at the cage side wall or mid-way or one-third the distance between cage side walls. Because a portion of the proximal end 30 has been wrapped around the vertical post 46, the first fastener hole 38 and the second fastener hole 42 can be aligned, so that a fastener 50 can be inserted therethrough and thereby attach the proximal end 30 to the inclined ramp extension 18 while maintaining the contact strip substantially vertical. The distal end 34 is disposed on top of a conveyor belt 22.

Figure 7:
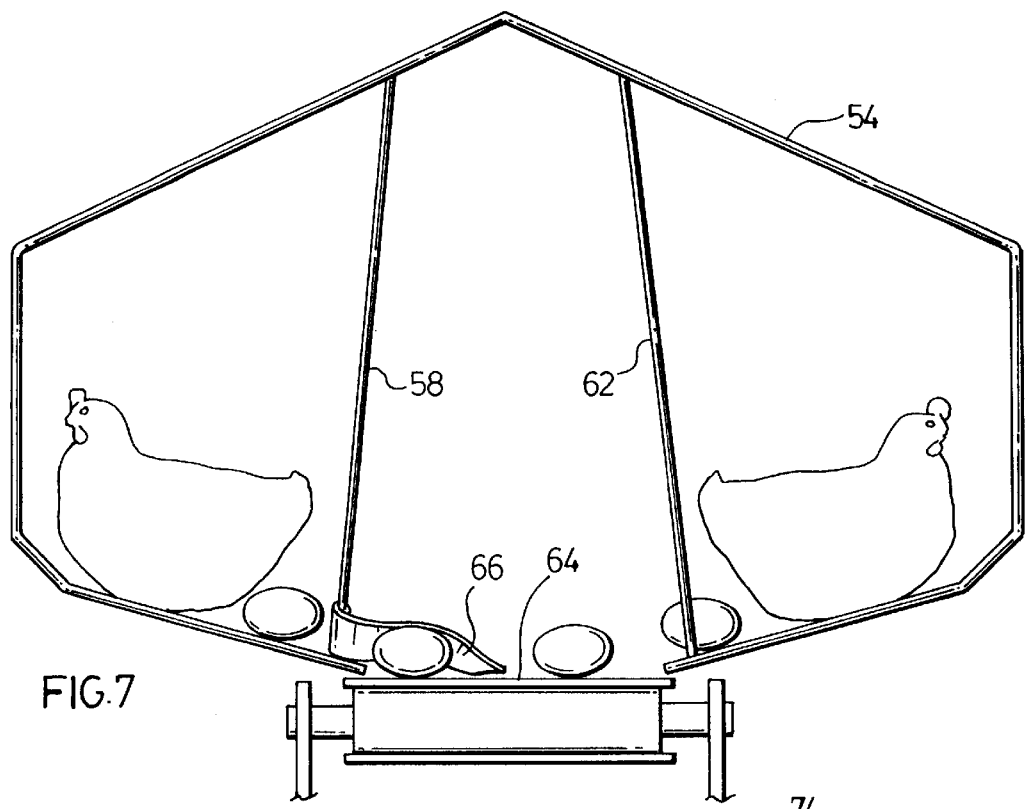
FIG. 7 is a side view of a floor cage arrangement showing two cages with a common conveyor belt.

The contact strip can have holes punched or otherwise made in it at the proximal end, to receive a fastener. The fastener inserted through the holes can be a plastic cable tie. Alternatively, a metal ring of the type known as a "hog ring" can be used as the fastener. The hog ring can be used without fastener holes first having been made in the contact strip. The hog ring is open before insertion and squeezed after insertion thereof to close the ring to form an approximately circular shape. As the hog ring is closed, it can punch through the contact strip, if fastener holes have not already been prepared in the contact strip. Hook and loop fasteners, rivets, adhesive, adhesive tape and glue can also be used to attach the contact strip to a vertical post.

Where a cage has a sheet of metal or other durable material forming its side portion such as in nesting boxes, a hole can be punched or drilled in such sheet, to receive a fastener or other fastening means. The contact strip could be attached to the sheet by means of a plastic cable tie, a plastic or metal rivet, a metal ring, adhesive, or glue. FIG. 7 is a side view of an arrangement of open-sided nesting boxes indicated generally at 54 showing a box 58 and a box 62 having sheet metal side portions and a common conveyor belt 64. For the purposes of illustration, only box 58 is shown as having a contact strip 66 attached to it. In practice, each cage within an arrangement of floor boxes would have at least one contact strip.

A timing means can be used to activate the conveyor belt intermittently to travel in the conveyor belt's direction of travel a distance which is equal to or greater than the effective length of the contact strip or the width of the cage or box opening, whichever is lesser. The periods between activation can be set such that the possibility of a newly-laid egg being struck directly by another newly-laid egg which was laid in the same cage or box would be optimally minimized.

Figure 8:
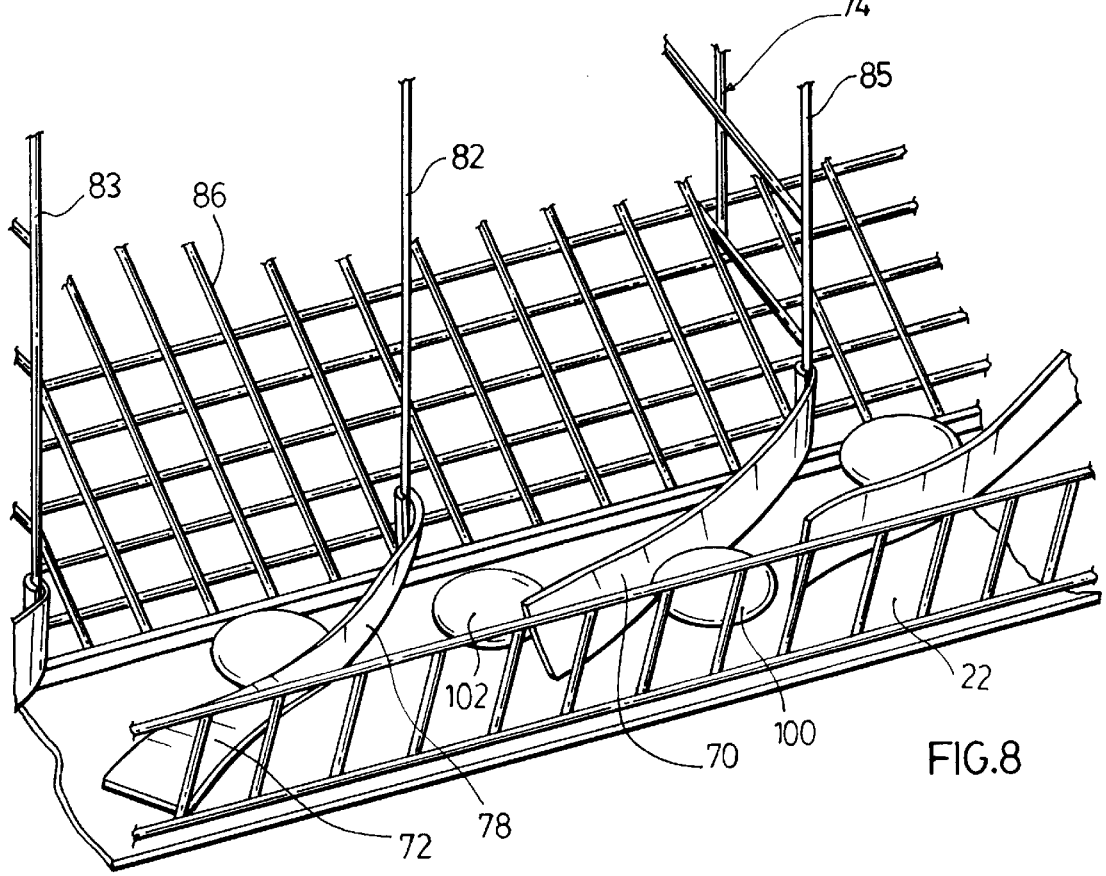
FIG. 8 is a perspective view of a cage showing a second contact strip attached to a support wire intermediate the side walls of the cage.

FIG. 8 shows an alternative embodiment in which, in addition to a first contact strip 70 attached on the upstream side of cage 74, a second contact strip 78 is attached to a support wire 82 located in cage opening 86 mid-way between side walls 83 and 85. Use of the second contact strip 78, or of three contact strips spaced one-third the distance of the cage opening across the cage opening, can provide the following advantages: (i) where the cage has one or more support wires in the cage opening, the second or additional contact strip can act as a bumper, serving to reduce the damage to an egg which collides with a support wire as the egg rolls out of the cage; and (ii) where a second contact strip is used, for example, as compared to a situation in which only one contact strip is used, an egg laid in the cage to which such second contact strip is attached need not travel as far to move from the area in which another egg laid in the same cage can come into direct contact with the prior egg, so that relatively shorter intermittent activation periods of the conveyor belt may be used, resulting in relatively more efficient egg collection.

In operation, a first egg designated by numeral 100 laid in an upstream cage (or nest) rolls onto conveyor belt 22 and is advanced by belt 22 in the direction indicated by arrow 28. A second egg 102 laid in a downstream cage rolls in a first direction down the slope of the cage floor towards the belt 22. As the belt 22 is advanced intermittently a distance substantially equal to the effective length of contact strips 26, or the width of the cage opening, the distal end of the contact strip 26 is drawn along belt 22 (FIGS. 3 and 4) to position contact strip 26 between first eggs 100 and second downstream eggs 102 (FIG. 8), thereby effectively protecting eggs 100 from direct physical contact with eggs 102 until the eggs converge in parallel travel on belt 22.

It will be apparent that, while presently preferred embodiments of the invention are described herein, variations and modifications will occur to those skilled in the art and should not be considered as departing from the spirit of the invention.

I claim:

1. A poultry cage comprising side walls defining a cage opening and a floor portion inclined down towards the cage opening, an elongated flexible contact strip having a proximal end and a distal end, means for attaching the proximal end of said elongated flexible contact strip to said cage or nesting box in proximity to the cage at the cage opening such that said proximal end of said contact strip is disposed on top of said floor portion and the distal end of said contact strip is disposed substantially horizontally on top of a conveyor belt, and such that said contact strip is held substantially vertically upright.

2. The contact strip as claimed in claim 1 wherein said means for attaching said proximal end to said cage or nesting box is a hook and loop fastener, cable tie, rivet, adhesive, adhesive tape, glue, or hog ring.

3. The contact strip as claimed in claim 1 wherein said flexible material has the characteristics of flexible polyester or polycarbonate resin.

4. The contact strip as claimed in claim 3 wherein said flexible material is polycarbonate.

5. In an apparatus for preventing a second egg from directly contacting a first egg when said second egg exits a cage travelling in a first direction through a cage opening, said cage opening having a width, said second egg having been laid in said cage, said cage having a front portion and a floor portion inclined down towards said front portion, and a ramp in proximity to a conveyor belt, to move the second egg onto said conveyor belt after said second egg exits said cage and rolls down said ramp, said conveyor belt being disposed and travelling in a second direction substantially transverse to said first direction from an upstream side to a downstream side, said cage opening being in said front portion of said cage, said first egg being disposed on said conveyor belt upstream in said second direction from said cage opening before the exit of said second egg from said cage opening, the improvement comprising at least one contact strip, said at least one contact strip having an effective length, a proximal end and a distal end and being made of a flexible material, and means for attaching said proximal end to said cage or in proximity to said cage near said cage opening such that said proximal end of said at least one contact strip extends from said upstream side of said cage opening in said first direction and said distal end of said at least one contact strip is disposed substantially horizontally on said conveyor belt downstream from said cage opening in said second direction, whereby said second egg is prevented by said at least one contact strip from directly contacting said first egg until said second egg is travelling in said second direction.

6. The apparatus as claimed in claim 5 wherein said at least one contact strip is from approximately 1" to 1.25" in height and from approximately 0.014" to 0.020" in thickness.

7. The apparatus as set forth in claim 6 wherein said at least one contact strip is 1⅛" in height and 0.014" in thickness.

8. The apparatus as claimed in claim 5 additionally comprising timing means for intermittently activating said conveyor belt whereby said conveyor belt can be intermittently activated to travel a distance in said second direction equal to or greater than said effective length of said contact strip or said at least one width of said cage opening, whichever is lesser.

9. The apparatus as claimed in claim 5 comprising two or more contact strips, each said contact strip having an effective length, a proximal end and a distal end and being made of a flexible material, and means for attaching each said proximal end of each said contact strip to said cage or in proximity to said cage at a point of connection near said cage opening, each said point of connection being upstream from at least a portion of said cage opening, such that each proximal end of each said contact strip extends from each said point of connection in said first direction and each said distal end of each said contact strip is disposed on said conveyor belt downstream from said cage opening in said second direction, whereby said second egg is prevented by said contact strip from directly contacting said first egg until said second egg is travelling in said second direction.

10. The apparatus as claimed in claim 9 additionally comprising timing means for intermittently activating said conveyor belt whereby said conveyor belt can be intermittently activated to travel a distance in said second direction equal to or greater than said effective length of each said contact strip as said width of said cage opening, whichever is lesser.

11. The contact strip as claimed in claim 5 wherein said means for attaching said proximal end to said cage or nesting box is a hook and loop fastener, cable tie, rivet, adhesive, adhesive tape, glue, or hog ring.

12. The contact strip as claimed in claim 5 wherein said flexible material has the characteristics of flexible polyester or polycarbonate resin.

13. A method of reducing damage to a second egg upon exiting a cage travelling in a first direction through a cage opening by preventing said second egg from directly contacting a first egg, said cage opening having a width, said second egg having been laid in said cage, said cage having a front portion and a floor portion inclined down towards said front portion, and a ramp in proximity to a conveyor belt, to move the second egg onto said conveyor belt after said second egg exits said cage and rolls down said ramp, said conveyor belt being disposed and travelling in a second direction substantially transverse to said first direction from an upstream side to a downstream side, said cage opening being in said front portion of said cage, said first egg being disposed on said conveyor belt upstream in said second direction from said cage opening before the exit of said second egg from said cage opening, comprising the step of attachment at least one contact strip to said cage or in proximity to said cage, said at least one contact strip having an effective length, a proximal end and a distal end and being made of a flexible material, whereby said proximal end of said contact strip is attached to said cage or in proximity to said cage such that said proximal end of said at least one contact strip extends from said upstream side of said cage opening in said first direction and said distal end of said at least one contact strip is disposed substantially horizontally on said conveyor belt downstream from said cage opening in said second direction, whereby said second egg is prevented by said at least one contact strip from directly contacting said first egg until said second egg is travelling in said second direction.

14. A method as claimed in claim 13 additionally comprising the step of advancing said conveyor belt intermittently, when said conveyor belt is activated by a timing means, whereby said conveyor belt can move a distance in said second direction equal to or greater than said effective length of said at least one contact strip or said width of said cage opening, whichever is lesser, when said conveyor belt is activated.

\* \* \* \* \*